United States Patent
Berjot et al.

(10) Patent No.: US 11,702,216 B2
(45) Date of Patent: Jul. 18, 2023

(54) AIRCRAFT COMPRISING A REAR WING ATTACHMENT HAVING AT LEAST TWO LATERAL LINKS AND A SHEAR PIN

(71) Applicant: Airbus Operations SAS, Toulouse (FR)

(72) Inventors: Michael Berjot, Toulouse (FR); Julien Cayssials, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 234 days.

(21) Appl. No.: 17/073,688

(22) Filed: Oct. 19, 2020

(65) Prior Publication Data

US 2021/0114741 A1    Apr. 22, 2021

(30) Foreign Application Priority Data

Oct. 21, 2019   (FR) ...................................... 1911752

(51) Int. Cl.
    *B64D 27/26*     (2006.01)

(52) U.S. Cl.
    CPC ........ *B64D 27/26* (2013.01); *B64D 2027/266* (2013.01)

(58) Field of Classification Search
    CPC .............. B64D 27/26; B64D 2027/264; B64D 2027/266
    See application file for complete search history.

(56) References Cited

U.S. PATENT DOCUMENTS

| 4,805,851 | A | * | 2/1989 | Herbst | ................... | F16F 1/371 |
| | | | | | | 244/54 |
| 4,917,331 | A | * | 4/1990 | Hager | ................... | B64D 27/00 |
| | | | | | | 244/54 |
| 6,095,456 | A | * | 8/2000 | Powell | ................... | B64D 27/18 |
| | | | | | | 60/797 |

(Continued)

FOREIGN PATENT DOCUMENTS

| EP | 1535838 A1 | 6/2005 |
| EP | 2426051 A1 | 3/2012 |

(Continued)

OTHER PUBLICATIONS

French Search Report; priority document.

*Primary Examiner* — Joseph W Sanderson
(74) *Attorney, Agent, or Firm* — Greer, Burns & Crain, Ltd.

(57) ABSTRACT

An aircraft including a rear wing attachment, connecting a primary structure of an aircraft pylon to its wing, and including at least one right-hand link connected to the wing by a first right-hand connecting element and to the primary structure by a second right-hand connecting element and configured to react loads oriented parallel to the vertical direction only, at least one left-hand link connected to the wing by a first left-hand connecting element and to the primary structure by a second left-hand connecting element and configured to react loads oriented parallel to the vertical direction only, a shear pin secured to the primary structure and housed in operation in a housing secured to the wing, the (Continued)

shear pin and the housing being configured to react loads oriented in a plane approximately perpendicular to the vertical direction.

9 Claims, 3 Drawing Sheets

(56) References Cited

U.S. PATENT DOCUMENTS

| | | | | |
|---|---|---|---|---|
| 6,938,855 | B2 * | 9/2005 | Marche | B64D 27/18 248/556 |
| 7,104,306 | B2 * | 9/2006 | Huggins | B64D 27/26 244/54 |
| 7,451,947 | B2 * | 11/2008 | Machado | B64D 27/12 60/797 |
| 8,353,476 | B2 * | 1/2013 | Crook | B64D 27/18 52/645 |
| 8,727,269 | B2 * | 5/2014 | Stuart | B64D 27/26 60/797 |
| 8,814,079 | B2 * | 8/2014 | Teulou | B64D 27/26 244/54 |
| 9,896,217 | B2 * | 2/2018 | Nakhjavani | B64D 27/26 |
| 10,246,196 | B2 * | 4/2019 | Pautis | B64D 27/26 |
| 10,266,273 | B2 * | 4/2019 | Kang | B64D 27/26 |
| 10,464,685 | B2 * | 11/2019 | Whiteford | B64D 27/26 |
| 10,597,144 | B2 * | 3/2020 | Fotouhie | B64C 15/12 |
| 10,988,264 | B2 * | 4/2021 | Jule | B64D 27/26 |
| 11,084,597 | B2 * | 8/2021 | Pautis | B64D 27/12 |
| 11,319,082 | B2 * | 5/2022 | Berjot | B64D 27/26 |
| 11,407,520 | B2 * | 8/2022 | Vayssieres | B64D 27/26 |
| 2004/0129832 | A1 | 7/2004 | Marche | |
| 2005/0082423 | A1 * | 4/2005 | Whitmer | B64D 27/26 244/54 |
| 2005/0178888 | A1 | 8/2005 | Machado et al. | |
| 2005/0274485 | A1 * | 12/2005 | Huggins | B22C 9/22 164/349 |
| 2008/0217502 | A1 * | 9/2008 | Lafont | B64D 27/26 248/554 |
| 2011/0011972 | A1 * | 1/2011 | Vache | B64D 27/26 244/54 |
| 2012/0056033 | A1 | 3/2012 | Teulou et al. | |
| 2012/0305700 | A1 * | 12/2012 | Stuart | B64D 27/18 244/54 |
| 2015/0013142 | A1 | 1/2015 | West | |
| 2015/0251768 | A1 * | 9/2015 | Woolley | B64D 29/02 244/54 |
| 2016/0159487 | A1 * | 6/2016 | Kang | B64D 27/18 244/54 |
| 2017/0096229 | A1 * | 4/2017 | Pautis | B64D 27/26 |
| 2017/0197723 | A1 * | 7/2017 | Nakhjavani | B64D 27/26 |
| 2019/0039744 | A1 * | 2/2019 | Jule | B64D 27/26 |
| 2019/0092484 | A1 * | 3/2019 | Whiteford | B64D 27/26 |
| 2019/0152616 | A1 | 5/2019 | Pautis et al. | |
| 2019/0168861 | A1 * | 6/2019 | Fotouhie | B64D 27/26 |

FOREIGN PATENT DOCUMENTS

| | | | |
|---|---|---|---|
| EP | 3489147 A1 | 5/2019 | |
| FR | 2963608 A1 * | 2/2012 | B64D 27/18 |
| WO | 03074359 A1 | 9/2003 | |

\* cited by examiner

Fig. 6
Fig. 7
Fig. 8
Fig. 9
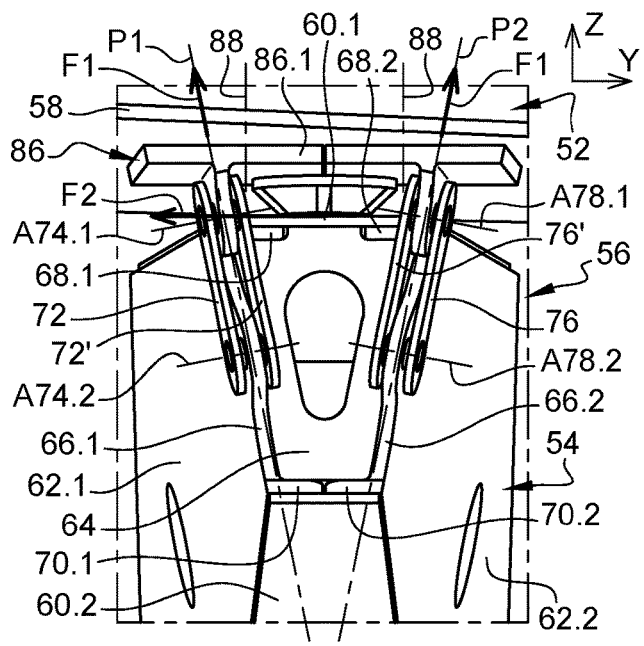
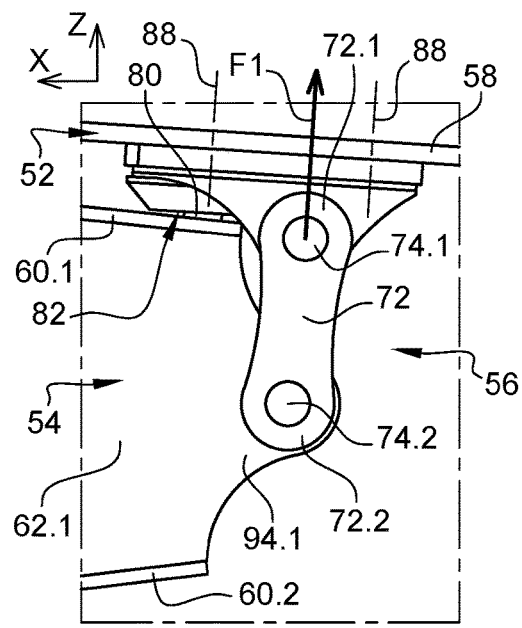
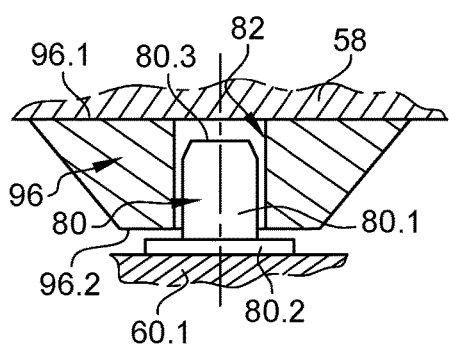
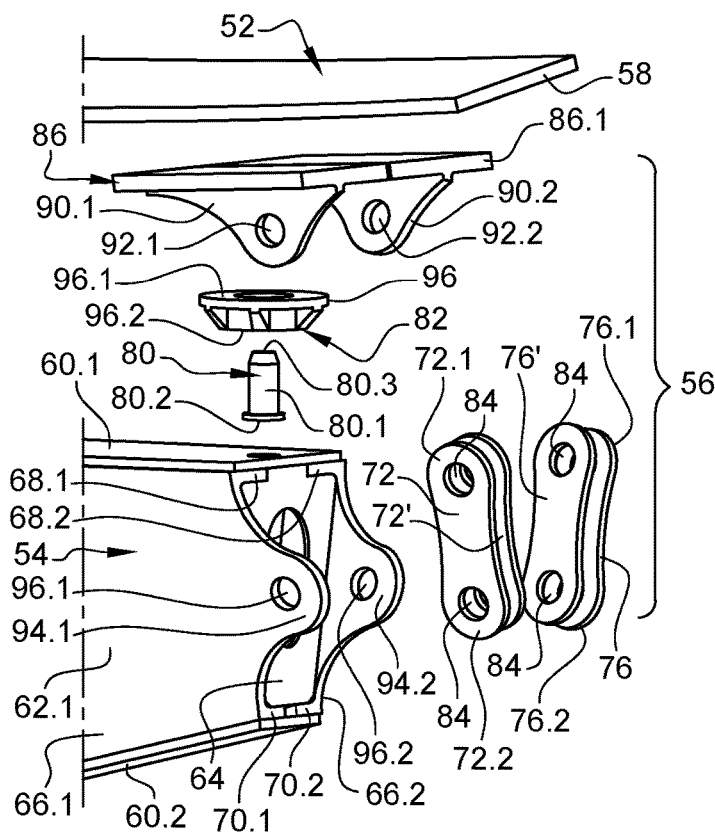

AIRCRAFT COMPRISING A REAR WING ATTACHMENT HAVING AT LEAST TWO LATERAL LINKS AND A SHEAR PIN

CROSS-REFERENCES TO RELATED APPLICATIONS

This application claims the benefit of the French patent application No. 1911752 filed on Oct. 21, 2019, the entire disclosures of which are incorporated herein by way of reference.

FIELD OF THE INVENTION

The present application relates to an acoustic absorption structure comprising a liquid drainage system and a propulsive assembly comprising such an acoustic absorption structure.

BACKGROUND OF THE INVENTION

According to one embodiment visible in FIGS. 1 and 2, an aircraft 10 comprises several propulsion assemblies 12 positioned under the wing 14 of the aircraft. Each propulsion assembly 12 comprises an engine 16, a nacelle (not depicted in FIG. 2) positioned around the engine 16, and a pylon 18 connecting the engine 16 and the wing 14. The pylon 18 comprises a primary structure 20 which is connected to the engine 16 by an engine attachment 22 and to the wing 14 by a wing attachment 24.

For the purposes of the present invention, a longitudinal direction (denoted X in FIG. 3) is substantially parallel to the axis of rotation A16 of the engine. A longitudinal plane is a vertical plane parallel to the longitudinal direction. A transverse plane is a plane perpendicular to the axis of rotation A16 of the engine. A horizontal transverse direction (denoted Y in FIG. 3) is a direction that is horizontal and perpendicular to the axis of rotation A16 of the engine. A vertical direction is denoted Z in FIG. 3. The terms front and rear refer to the direction of flow of the stream of air through the engine 16, which flows from front to rear.

The engine attachment 22 comprises a front engine attachment 26, a rear engine attachment 28 and a pair of thrust links 30 that react thrust loads.

According to one embodiment visible in FIG. 3, the wing attachment 24 comprises first and second front wing attachments 32.1, 32.2, an intermediate wing attachment 34 and a rear wing attachment 36. As illustrated in FIG. 3, the first and second front wing attachments 32.1, 32.2 are configured to react loads oriented approximately in the vertical direction Z, the intermediate wing attachment 34 is configured to react loads oriented in a longitudinal plane containing the directions X and Y, and the rear wing attachment 36 is configured to react loads oriented in a transverse plane containing the directions Y and Z.

The invention relates more particularly to the rear wing attachment 36.

According to one embodiment visible in FIG. 3, the rear wing attachment 36 comprises two transverse links (38, 38') that are parallel, closely spaced and positioned in approximately transverse planes. Each transverse link 38, 38' has a triangular shape and has first and second vertices 38.1, 38.2 connected by a side 40 oriented toward the primary structure 20, and a third vertex 38.3 oriented toward the wing 14.

The primary structure 20 has upper and lower spars 42.1, 42.2, right-hand and left-hand lateral frames 44.1, 44.2 and a rear wall 46 which is positioned in an approximately transverse plane, which has first and second lugs 48.1, 48.2 projecting with respect to the upper spar 42.1 and configured to be positioned between the two transverse links 38, 38'.

The wing 14 also comprises a third lug 48.3 configured to be positioned in the same plane as the first and second lugs 48.1, 48.2, between the two transverse links 38, 38'.

The rear wing attachment 36 also comprises first and second connecting elements 50.1, 50.2 connecting the first and second lugs 48.1, 48.2 of the primary structure 20 and the first and second vertices 38.1, 38.2 of the two transverse links 38, 38', and a third connecting element 50.3 connecting the third lug 48.3 of the wing 14 and the third vertex 38.3 of the two transverse links 38, 38'. The first, second and third connecting elements 50.1 to 50.3 have axes of pivoting that are parallel to one another and oriented approximately parallel to the longitudinal direction X.

This embodiment leads to a relatively great bulkiness in the vertical direction and to the primary structure 20 being kept distanced from the wing 14. Now, in certain instances, for example in the case of UHBR (ultra high bypass ratio) engines, it is absolutely essential to bring the primary structure 20 as close as possible to the wing 14.

The present invention seeks to overcome all or some of the disadvantages of the prior art.

SUMMARY OF THE INVENTION

To this end, the subject of the invention is an aircraft comprising at least one wing, at least one primary structure of a pylon and a rear wing attachment connecting the primary structure and the wing, the primary structure having upper and lower spars and right-hand and left-hand lateral panels, wherein the rear wing attachment comprises:
  at least one right-hand link, having a first end connected to the wing by a first right-hand connecting element and a second end connected to the primary structure by a second right-hand connecting element, the first and second right-hand connecting elements having axes of pivoting that are mutually parallel and approximately perpendicular to the right-hand lateral panel,
  at least one left-hand link, having a first end connected to the wing by a first left-hand connecting element and a second end connected to the primary structure by a second left-hand connecting element, the first and second left-hand connecting elements having axes of pivoting that are mutually parallel and approximately perpendicular to the left-hand lateral panel,
  a shear pin secured to a first of either the wing or the primary structure and housed in operation in a housing secured to a second, different from the first, of either the wing or the primary structure, the shear pin and the housing being configured to react loads oriented in a plane approximately perpendicular to the vertical direction.

This design makes it possible to obtain a reduced distance between the wing and the primary structure at the level of the rear wing attachment.

According to another feature, the right-hand and left-hand lateral panels respectively comprise right-hand and left-hand extensions projecting toward the rear with respect to the upper spar, the right-hand extension having a right-hand passage hole configured to house the second right-hand connecting element, the left-hand extension having a left-hand passage hole configured to house the second left-hand connecting element.

According to another feature, the rear wing attachment comprises a wing fitting attached to the wing, having right-hand and left-hand flanges that are respectively parallel to the right-hand and left-hand lateral panels, the right-hand flange having a passage hole configured to house the first right-hand connecting element, the left-hand flange having a passage hole configured to house the first left-hand connecting element.

According to another feature, the rear wing attachment comprises two right-hand links positioned one on each side of the right-hand flange of the wing fitting and of the right-hand extension of the right-hand lateral panel, and two left-hand links positioned one on each side of the left-hand flange of the wing fitting and of the left-hand extension of the left-hand lateral panel.

According to another feature, each of the first and second right-hand and left-hand connecting elements comprises a ball-pivot connection.

According to another feature, each of the first and second right-hand and left-hand connecting elements comprises a cylindrical body having an outside diameter approximately identical to the diameters of the passage holes made in the right-hand and left-hand links, a ball pivot being interposed between the cylindrical body and each of the passage holes made in the right-hand and left-hand flanges and the right-hand and left-hand extensions.

According to another feature, the right-hand and left-hand lateral panels make an angle of approximately ten degrees (+/− two degrees), such that the right-hand and left-hand lateral panels diverge slightly in the direction toward the wing.

According to another feature, the right-hand and left-hand links and the shear pin are positioned symmetrically with respect to a vertical midplane of the primary structure.

According to another feature, the shear pin is secured to the upper spar of the primary structure and the housing is secured to the wing.

BRIEF DESCRIPTION OF THE DRAWINGS

Further features and advantages will become apparent from the following description of the invention, which description is given solely by way of example and with reference to the attached figures among which:

FIG. 6 is a rear view of a rear wing attachment illustrating one embodiment of the invention, FIG. 7 is a lateral view of a rear wing attachment illustrating one embodiment of the invention, FIG. 8 is a view in cross section of a shear pin in its housing, illustrating one embodiment of the invention, and FIG. 9 is a perspective and exploded view of a rear wing attachment illustrating one embodiment of the invention.

DETAILED DESCRIPTION OF THE PREFERRED EMBODIMENTS

According to one embodiment visible in FIGS. 4 to 9, an aircraft comprises at least one wing 52, at least one primary structure 54 of an aircraft pylon and at least one wing attachment connecting the primary structure 54 and the wing 52.

Figure 1:
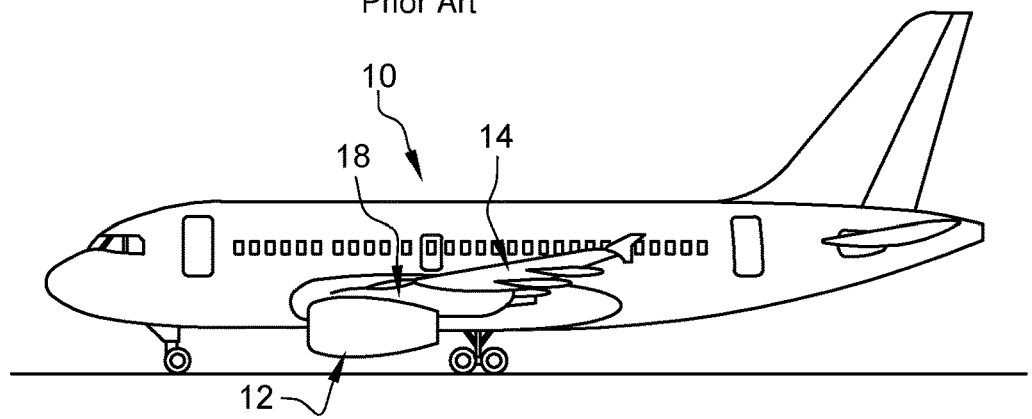
FIG. 1 is a lateral view of an aircraft.
Figure 2:
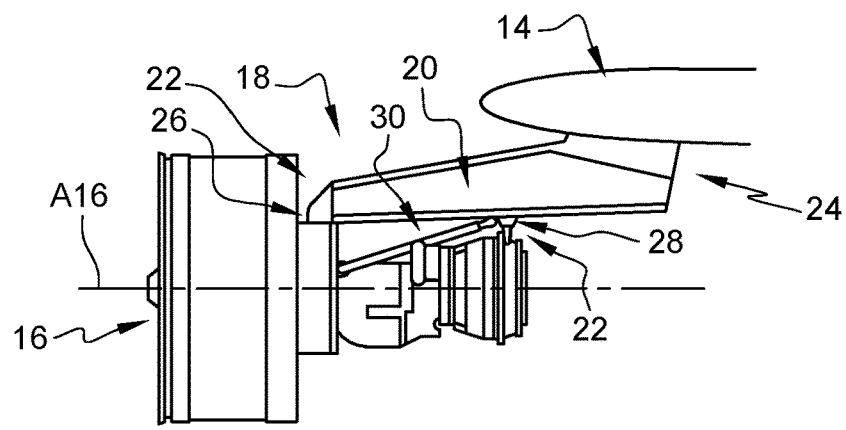
FIG. 2 is a lateral view of a propulsion assembly, with its nacelle not being depicted.
Figure 3:
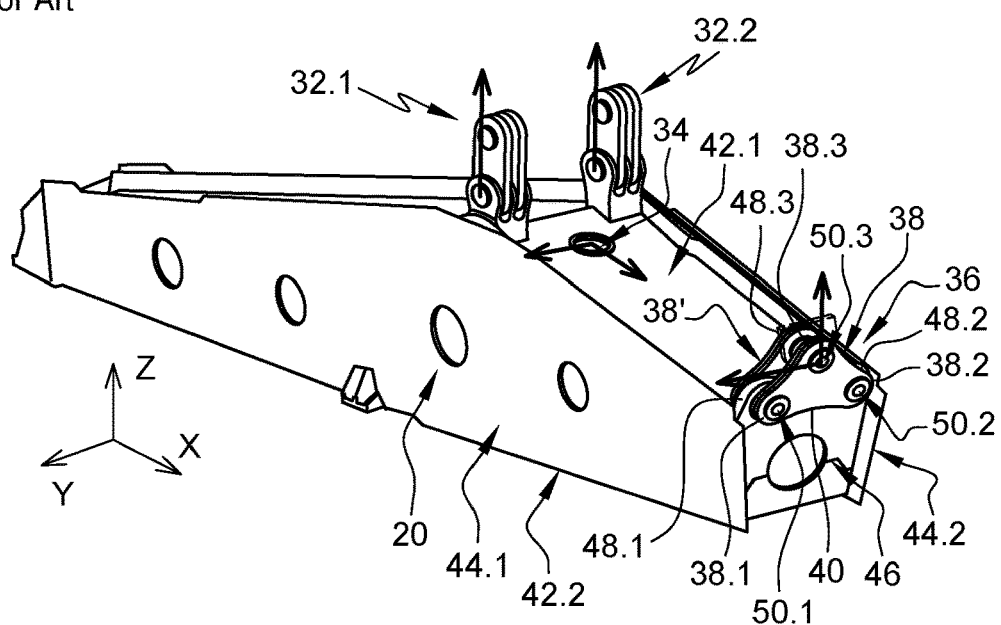
FIG. 3 is a perspective view of a primary structure of a pylon and of a wing attachment illustrating an embodiment of the prior art.
Figure 4:
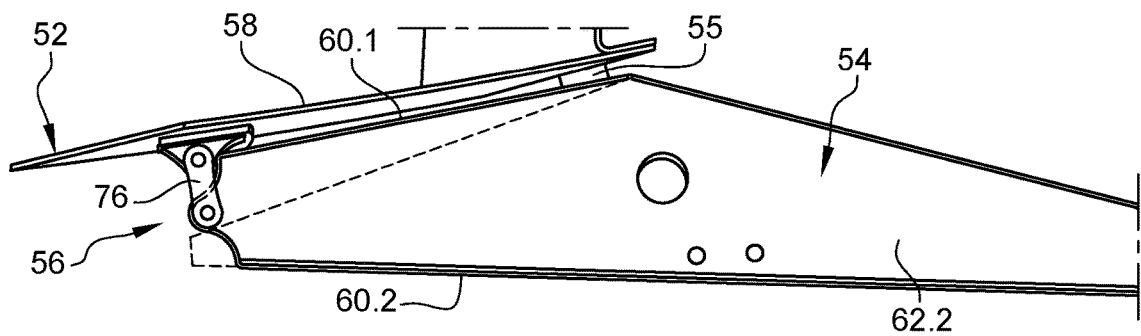
FIG. 4 is a lateral view of a primary structure of an aircraft pylon and of a rear wing attachment, illustrating one embodiment of the invention compared with an embodiment of the prior art shown in dotted line.
Figure 5:
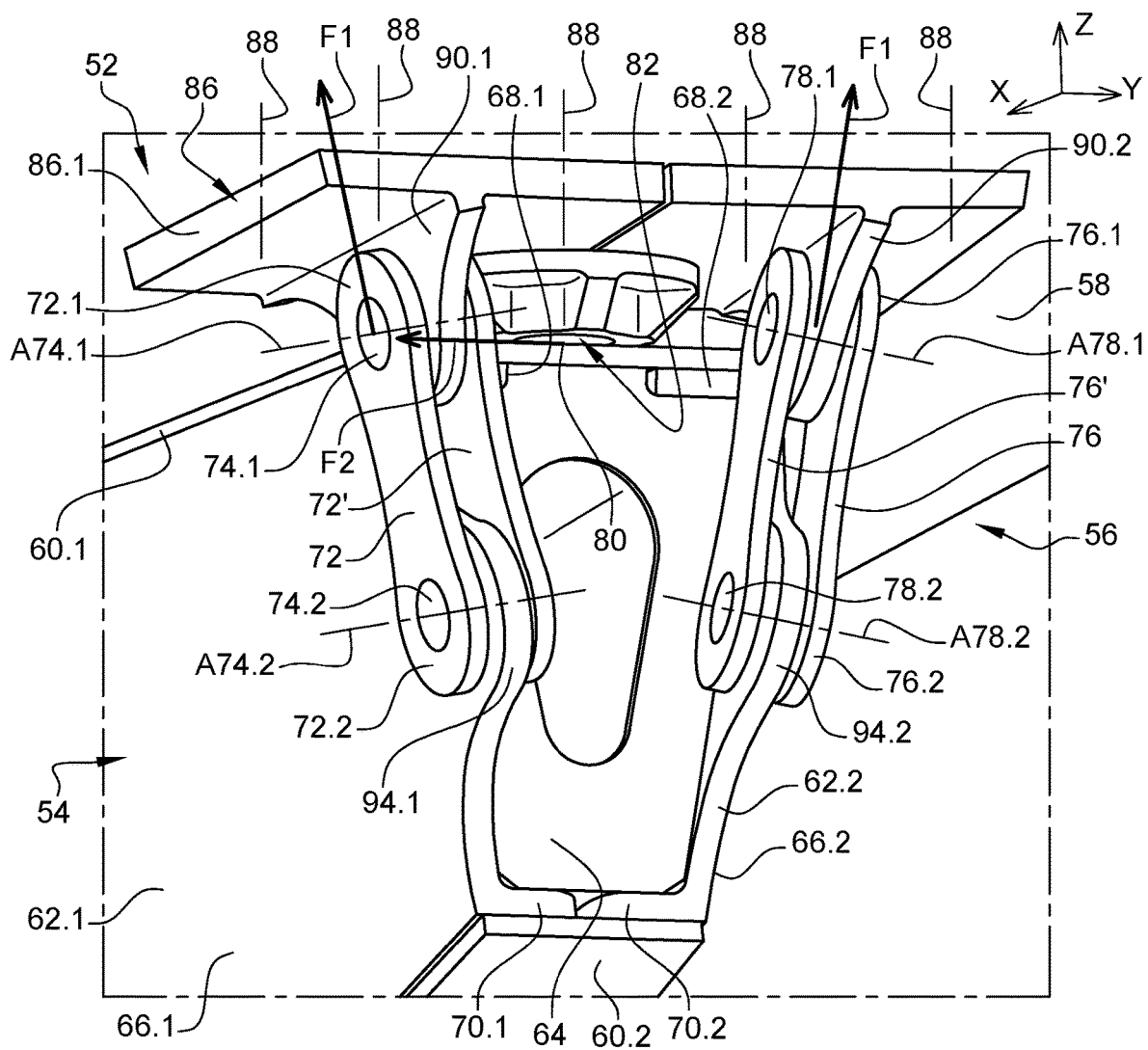
FIG. 5 is a perspective view of a rear wing attachment illustrating one embodiment of the invention.

The wing attachment comprises first and second front wing attachments 55, depicted schematically in FIG. 4, and a rear wing attachment 56. The wing attachment may comprise an intermediate wing attachment (not depicted).

The wing 52 comprises a lower panel 58. This wing is not described further because it is known to those skilled in the art.

The primary structure 54 comprises an upper spar 60.1, a lower spar 60.2, a right-hand lateral panel 62.1, a left-hand lateral panel 62.2 and a rear wall 64.

According to one embodiment visible notably in FIG. 9, each right-hand or left-hand lateral panel 62.1 or 62.2 is C shaped and exhibits a web 66.1, 66.2, an upper flange 68.1, 68.2 against which the upper spar 60.1 is firmly pressed and attached, and a lower flange 70.1, 70.2 against which the lower spar 60.2 is firmly pressed and attached. According to one configuration, the upper flanges 68.1, 68.2 of the right-hand and left-hand lateral panels 62.1, 62.2 are not touching and the lower flanges 70.1, 70.2 of the right-hand and left-hand lateral panels 62.1, 62.2 are touching.

As illustrated in FIG. 6, the right-hand lateral panel 62.1, more specifically the web 66.1 thereof, is positioned in a right-hand plane of reference P1 and the left-hand lateral panel 62.2, more particularly the web 66.2 thereof, is positioned in a left-hand plane of reference P2.

According to one particular feature of the invention, the rear wing attachment 56 comprises:

at least a first lateral link, referred to as the right-hand link 72, having a first end 72.1 connected to the wing 52 by a first right-hand connecting element 74.1 and a second end 72.2 connected to the primary structure 54, more particularly to the right-hand lateral panel 62.1, by a second right-hand connecting element 74.2, the first and second right-hand connecting elements 74.1, 74.2 comprising a ball-pivot connection and having axes of pivoting A74.1, A74.2 that are mutually parallel and approximately perpendicular to the right-hand plane of reference P1, at least a second lateral link, referred to as the left-hand link 76, having a first end 76.1 connected to the wing 52 by a first left-hand connecting element 78.1 and a second end 76.2 connected to the primary structure 54, more particularly to the left-hand lateral panel 62.2, by a second left-hand connecting element 78.2, the first and second left-hand connecting elements 78.1, 78.2 comprising a ball-pivot connection and having axes of pivoting A78.1, A78.2 that are mutually parallel and approximately perpendicular to the left-hand plane of reference P2, a shear pin 80 secured to a first of either the wing 52 or the primary structure 54 and configured to be housed in a housing 82 secured to a second, different from the first, of either the wing 52 or the primary structure 54, the shear pin 80 being oriented in an approximately vertical direction Z.

According to this configuration, because the first and second right-hand and left-hand connecting elements 74.1, 74.2, 78.1, 78.2 have a ball-pivot connection, the right-hand and left-hand links 72, 76 are configured to react loads F1 that are approximately vertical and oriented parallel to the right-hand and left-hand planes of reference P1, P2 only. To complement that, the shear pin 80 and its housing 82 react loads F2 oriented approximately parallel to the horizontal transverse direction Y, more generally positioned in a plane XY approximately perpendicular to the vertical direction Z.

According to one embodiment visible in FIG. 9, each of the right-hand and left-hand links 72, 76 takes the form of a strip of material with rounded first and second ends 72.1, 76.1, 72.2, 76.2 at each of which there is a passage hole 84. In operation, each right-hand link 72 is positioned in a plane parallel to the right-hand plane of reference P1 and each left-hand link 76 is positioned in a plane parallel to the left-hand plane of reference P2.

According to one embodiment, the rear wing attachment 56 also comprises a wing fitting 86, exhibiting a mounting plate 86.1 attached by fixings 88 to the lower panel 58 of the wing 52, and right-hand and left-hand flanges 90.1, 90.2 which are connected to the mounting plate 86.1 and respectively parallel to the right-hand and left-hand planes of reference P1, P2. The right-hand flange 90.1 has a passage hole 92.1 configured to house the first right-hand connecting element 74.1, and the left-hand flange 90.2 has a passage hole 92.2 configured to house the first left-hand connecting element 78.1.

According to one embodiment, each of the right-hand and left-hand lateral panels 62.1, 62.2 comprises a right-hand or left-hand extension 94.1, 94.2 projecting toward the rear with respect to the rear wall 64 or to the upper spar 60.1. The right-hand extension 94.1 has a right-hand passage hole 96.1 configured to house the second right-hand connecting element 74.2, and the left-hand extension 94.2 has a left-hand passage hole 96.2 configured to house the second left-hand connecting element 78.2.

According to one configuration, each of the first and second right-hand and left-hand connecting elements 74.1, 74.2, 78.1, 78.2 comprises a cylindrical body having an outside diameter approximately identical to the diameters of the passage holes 84 of the right-hand and left-hand links 72, 76, a ball pivot being interposed between the cylindrical body and each of the passage holes 92.1, 92.2, 96.1, 96.2 of the right-hand and left-hand flanges 90.1, 90.2 and of the right-hand and left-hand extensions 94.1, 94.2.

According to one embodiment, the rear wing attachment 56 comprises two right-hand links 72, 72' positioned one on each side of the right-hand flange 90.1 of the wing fitting 86 and of the right-hand extension 94.1 of the right-hand lateral panel 62.1, and two left-hand links 76, 76' positioned one on each side of the left-hand flange 90.2 of the wing fitting 86 and of the left-hand extension 94.2 of the left-hand lateral panel 62.2.

According to one configuration, the right-hand plane of reference P1 and the left-hand plane of reference P2 are not parallel and form an angle of approximately ten degrees (+/1 two degrees), such that the right-hand and left-hand lateral panels 62.1, 62.2 diverge slightly in the direction toward the wing 52. This solution makes it possible to obtain a primary structure 54 with a reduced width at the level of the lower spar 60.2.

According to one configuration, the shear pin 80 is secured to the upper spar 60.1 of the primary structure 54 and the housing 82 is secured to the lower panel 58 of the wing 52.

According to an embodiment visible in FIG. 8, the shear pin 80 comprises a cylindrical body 80.1 comprising a substantially vertical axis, a mounting plate 80.2 positioned at a first end of the cylindrical body 80.1 and attached to the upper spar 60.1 of the primary structure 54, and a free end 80.3 that is rounded or chamfered.

According to an embodiment visible in FIG. 8, the rear wing attachment 56 comprises a base 96 having a first face 96.1 oriented toward the lower panel 58 of the wing 52 and attached to the latter or to the wing fitting 86, and a second face 96.2 oriented toward the primary structure 54. This base 96 comprises a cylindrical orifice acting as the housing 82, opening onto the second face 96.2, having a vertical axis and a diameter substantially equal to that of the cylindrical body 80.1 of the shear pin 80.

The right-hand and left-hand links 72, 76 and the shear pin 80 are positioned symmetrically with respect to a vertical midplane of the primary structure 54.

As illustrated in FIG. 4, the connections between the right-hand and left-hand links 72, 76 and the primary structure 54 are positioned below the upper spar 60.1. Consequently, when the shear pin 80 is positioned in the housing 82, the upper spar 60.1 of the primary structure 54 is very close to the lower panel 58 of the wing 52 which means that the distance between the wing 52 and the primary structure 54 is markedly reduced in comparison with the distance between the wing 52 and a primary structure 20 of the prior art.

According to another advantage, the second right-hand and left-hand connecting elements 74.2, 78.2 do not encumber the inside of the primary structure 54 insofar as they are offset toward the rear with respect to the rear wall 64.

Finally, when the rear wing attachment 56 is combined with a front wing attachment 55 which comprises at least two right-hand and left-hand lateral links as in the prior art, the wing attachment comprises, on each side of the primary structure 54, two distinct paths for reacting loads in the direction Z, making the design "fail-safe".

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   at least one wing,
   at least one primary structure of a pylon, and
   a rear wing attachment connecting the primary structure and the wing,
      the primary structure having an upper spar and a lower spar and a right-hand lateral panel and a left-hand lateral panel,
   wherein the rear wing attachment comprises:
      at least one right-hand link, having a first end connected to the wing by a first right-hand connecting element and a second end connected to the primary structure by a second right-hand connecting element,
      the first and second right-hand connecting elements having axes of pivoting that are mutually parallel and perpendicular to the right-hand lateral panel,
      at least one left-hand link, having a first end connected to the wing by a first left-hand connecting element and a second end connected to the primary structure by a second left-hand connecting element, the first and second left-hand connecting elements having axes of pivoting that are mutually parallel and perpendicular to the left-hand lateral panel, the second right-hand connecting element and the second left-hand connecting element are positioned below the upper spar of the primary structure, and a shear pin secured to a first of either the wing or the primary structure and housed in operation in a housing secured to a second, different from the first, of either the wing or the primary structure, the shear pin and the housing being configured to react loads oriented in a plane perpendicular to a vertical direction.

2. The aircraft as claimed in claim 1, wherein the right-hand and left-hand lateral panels respectively comprise a right-hand extension and a left-hand extension projecting toward the rear with respect to the upper spar, the right-hand extension having a right-hand passage hole configured to house the second right-hand connecting element, the left-hand extension having a left-hand passage hole configured to house the second left-hand connecting element.

3. The aircraft as claimed in claim 2, wherein the rear wing attachment comprises a wing fitting attached to the wing, having a right-hand flange and a left-hand flange that are respectively parallel to the right-hand lateral panel and the left-hand lateral panel, the right-hand flange having a passage hole configured to house the first right-hand connecting element, the left-hand flange having a passage hole configured to house the first left-hand connecting element.

4. The aircraft as claimed in claim 3, wherein the rear wing attachment comprises two right-hand links positioned one on each side of the right-hand flange of the wing fitting and of the right-hand extension of the right-hand lateral panel, and left-hand links positioned one on each side of the left-hand flange of the wing fitting and of the left-hand extension of the left-hand lateral panel.

5. The aircraft as claimed in claim 4, wherein each of the first and second right-hand and left-hand connecting elements comprises a ball-pivot connection, and wherein each of the first and second right-hand and left-hand connecting elements comprises a cylindrical body having an outside diameter approximately identical to diameters of the passage holes made in the right-hand and left-hand links, a ball pivot being interposed between the cylindrical body and each of the passage holes made in the right-hand and left-hand flanges and the right-hand and left-hand extensions.

6. The aircraft as claimed in claim 1, wherein each of the first and second right-hand and left-hand connecting elements comprises a ball-pivot connection.

7. The aircraft as claimed in claim 1, wherein the right-hand and left-hand lateral panels make an angle of ten degrees, such that the right-hand and left-hand lateral panels diverge slightly in a direction toward the wing.

8. The aircraft as claimed in claim 1, wherein the at least one right-hand link and the at least one left-hand link and the shear pin are positioned symmetrically with respect to a vertical midplane of the primary structure.

9. The aircraft as claimed in claim 1, wherein the shear pin is secured to the upper spar of the primary structure and wherein the housing is secured to the wing.

* * * * *